R. W. LESLEY & H. S. SPACKMAN.
APPARATUS FOR MAKING CEMENT.
APPLICATION FILED OCT. 4, 1906.
929,144.
Patented July 27, 1909.
2 SHEETS—SHEET 1.
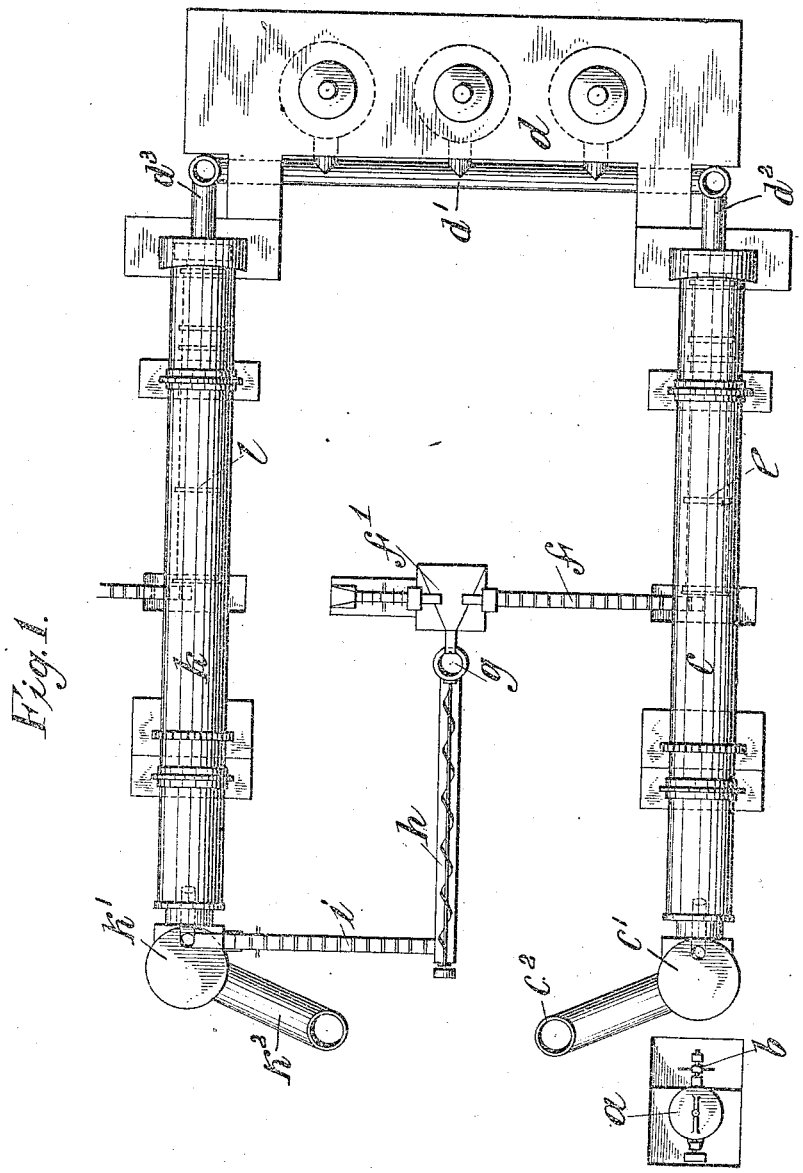

R. W. LESLEY & H. S. SPACKMAN.
APPARATUS FOR MAKING CEMENT.
APPLICATION FILED OCT. 4, 1906.
929,144.
Patented July 27, 1909.
2 SHEETS—SHEET 2.
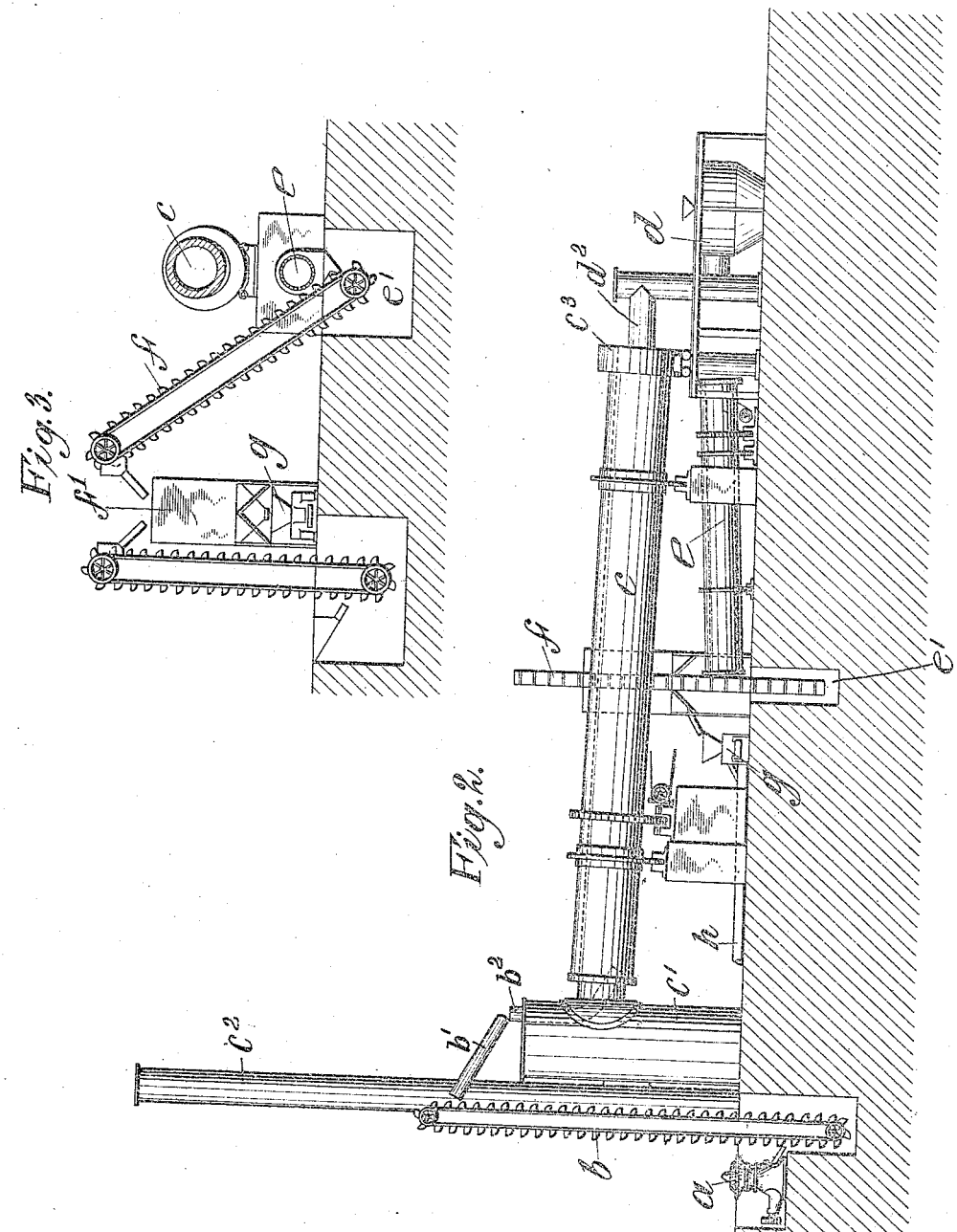

UNITED STATES PATENT OFFICE.

ROBERT W. LESLEY, OF HAVERFORD, AND HENRY S. SPACKMAN, OF ARDMORE, PENNSYLVANIA, ASSIGNORS TO PINE STREET PATENTS COMPANY, A CORPORATION OF NEW JERSEY.

APPARATUS FOR MAKING CEMENT.

No. 929,144. Specification of Letters Patent. Patented July 27, 1909.

Application filed October 4, 1906. Serial No. 337,346.

*To all whom it may concern:*

Be it known that we, ROBERT W. LESLEY, residing at Haverford, Pennsylvania, and HENRY S. SPACKMAN, residing at Ardmore, Pennsylvania, both citizens of the United States, have invented certain new and useful Improvements in Apparatus for Making Cement, of which the following is a specification, reference being had to the accompanying drawings, forming a part hereof.

In the manufacture of Portland and other commercial cements, the raw materials which may be mixtures of clay or slate with limestone, marl, etc., or may be cement rock, with or without admixtures of limestone, slate, etc., are first dried and then ground to a flour-like fineness, say so that 90 per cent. will pass through a hundred mesh sieve. This fine material, in the practice usual in this country is then passed downward through a rotary inclined kiln as a traveling stream against a current of flame and flame gases coming from flame-producing means in the mouth of the kiln whereby the material is calcined, or freed from carbonic acid gas (carbon dioxid) and is then brought to incipient vitrification or clinkering. The clinker produced is finally ground to an impalpable powder to form ordinary commercial cement. The crushing and pulverizing of the raw materials require expensive machines and the expenditure of a great amount of power. Moreover, about one-third of the weight and bulk of the raw materials is made up of carbonic acid gas and moisture which are eliminated in the calcining stage. The useless weight and bulk must be handled through all the stages of treatment up to the actual clinkering. The great amount of power consumed in handling so much unnecessary weight and in pulverizing the raw materials which are then in their hardest condition, forms a large feature in the cost of producing cement. Hard, dense limestones and cement rocks are usually preferred because of their density since they occupy less space in the kiln and render a larger output possible; and these hard rocks are of course expensive to comminute to a flourlike fineness by dry-grinding methods. It has been proposed to calcine or partially calcine the raw materials in a vertical kiln, driving off the carbonic acid gas and the moisture and rendering the further reduction of the materials easier, then to grind to powder and treat in a rotary kiln and finally to pulverize the clinker as usual, but the process as carried out with a vertical kiln is not and cannot be continuous, involving practically a double manufacturing process, and moreover the expenditure of time and labor involved in the use of a vertical kiln is so great as to prohibit the commercial manufacture of cement by this double process. Fine grinding at some stage in the operation is required to insure that in the clinkering stage the cement-forming ingredients shall be uniformly and thoroughly admixed in the form of excessively fine powders. Since in clinkering the fusion or sintering is not allowed to go very far, the reaction of these bodies on each other is largely superficial and if a particle of clay or lime, for instance, be comparatively coarse it will only be converted superficially, retaining a core of unconverted material. It is therefore absolutely necessary that in clinkering the clinker-making bodies shall be presented to each other in the form of intimately and homogeneously admixed, impalpably fine powders. But it is not necessary that this fine-grinding be performed on the raw materials prior to their entrance into the kiln system; it is, on the other hand, desirable that this grinding be postponed to an intermediate stage of the operation after the materials have lost their original hardness.

It is the object of this invention to provide an apparatus in which the manufacture of cement can be carried on as a continuous process without intermission from beginning to end and without requiring the manual handling of the materials at any stage, which shall enable much of the heavy and expensive crushing and grinding machinery to be dispensed with, and shall permit much or all of the unnecessary weight of carbonic acid gas and moisture to be eliminated at an early stage in the process of manufacture, thereby enabling the treatment of much more material per time unit in a given kiln. There is a maximum thickness of the layer of traveling material which can be passed through a rotary kiln and with a material thus calcined the output of clinker is increased.

In accordance with the invention, the preliminary crusher delivers the raw material, whether limestone or cement rock or a mixture of both, directly and continuously to a rotary kiln in which the temperature is maintained at a degree sufficiently high to drive off carbonic acid gas and moisture, thus reducing the material to a softer, more porous and more friable condition. From the rotary kiln the material passes as a continuous stream to and through a grinding mill by which it is reduced to powder and from the mill the powdered material passes continuously to a second rotary kiln in which the temperature is maintained at a degree sufficiently high to effect combination or clinkering. The final pulverizing of the clinker follows as usual. The invention, however, will be more fully explained hereinafter, with reference to the accompanying drawings in which it is illustrated as embodied in a convenient and practical apparatus, and in which—

Figure 1 is a plan view of a cement making apparatus constructed in accordance with the invention. Fig. 2 is a view thereof in side elevation. Fig. 3 is a partial end elevation.

In this showing $a$ is a rock crusher of an ordinary type delivering crushed material into a suitable receptacle whence it is removed by a conveyer $b$ and transferred to chute $b^1$, whence it passes through $b^2$ into a calcining kiln $c$. The calcining kiln is provided at its upper end with a dust chamber $c^1$ communicating with stack $c^2$. At the lower end this kiln is provided with a customary stationary housing $c^3$. A battery of gas producers $d$ communicating with gas line $d^1$ feeds gas burner $d^2$ passing through the housing and into the mouth of the kiln. The calcined material falls through the housing in the usual manner into cooler $e$ and thence into a calcines pit $e^1$. Air passing up through the cooler $e$ and through the housing, is heated by the calcines and serves to aid in the combustion of the fuel burning in the mouth of the kiln. The calcined material is removed by conveyer $f$ to regrinding means $f^1$. From the regrinding means, the fine material is taken by hopper $g$ and conveyers $h$ and $i$ into the upper end of a similar kiln $k$. At its upper end this kiln enters a dust chamber $k^1$ communicating with stack $k^2$. The calcined fine ground material passing down through $k$ is heated by a flame from gas burner $d^3$ entering through a stationary housing in the mouth of the kiln in the same manner as in the first kiln. The clinkered material passes downward through the housing into another cooler $l$ (shown in Fig. 1 in dotted lines and similar to the cooler shown in Fig. 2). Air passes up through this clinker cooler, aiding in the cooling of the clinker and the combustion of the gas flame in the mouth of the kiln.

In the operation with the described apparatus, the raw material, whether it be limestone, or cement rock, or a mixture of both, or any other cement making material which requires crushing, is delivered continuously to the stone crusher $a$ by which it is reduced to a coarsely crushed condition suitable for delivery to and calcination in the rotary kiln $c$, to which it is directly and continuously delivered from the stone crusher by gravity or by any other suitable means such as the elevator $b$. Flame from any suitable source, such as the gas producer $d$, is delivered into the rotary kiln $c$ and as the crushed raw material progresses constantly and continuously through the rotary kiln the carbonic acid gas and moisture of the raw material are driven off, wholly or in part, and the raw material loses much of its hardness and becomes much more friable and easily reduced to powder in the grinding mill to which the material is directly and continuously delivered from the rotary kiln through the cooler $e$ by gravity or by any other suitable means such as the elevator $f$. The mill $g$ may be of any suitable character, a simple mill of inexpensive construction and requiring comparatively little power to drive it being sufficient to reduce the partially or wholly calcined material to the degree of fineness required for the next step in the process. From the mill the ground material passes directly and continuously by gravity or by any other suitable means such as the conveyer $h$ and the elevator $i$ to the second rotary kiln $k$ in which the temperature is maintained at a degree sufficiently high to effect combination or clinkering. From the second kiln the clinker passes as usual through a cooler $l$ and thence to storage bins or directly to the final grinder and pulverizer as may be desired.

If the limestone and cement rocks or other hard material are not mixed before crushing and the first calcination, they may be mixed immediately after the first calcination, each material being passed continuously and constantly through a rotary kiln as above described. So also, if comparatively pure limestone rock and clay are the materials employed, the limestone rock is crushed and passed through the first rotary kiln as already described and the clay is then mixed with it as at $f^1$. The apparatus thus lends itself to various conditions of manufacture.

The temperature maintained in the first rotary kiln, as already stated, is merely sufficient to drive off all or nearly all of the carbonic acid gas and the moisture, being from 800° C. to 1000° C. according to the materials used. The temperature maintained in the second rotary kiln is high enough to effect combination or clinkering, being usually from 1500° C. to 1800° C. according to the materials employed.

It is to be observed that the progress of the material or materials through the apparatus is continuous, each principal element of the apparatus delivering directly and continuously, without intermission or handling of the materials, to the next in order, so that the passage of the materials from delivery to the first crusher until they leave the second kiln as clinker ready to be pulverized to form cement is continuous, without handling of the material at any intermediate stage.

It will be observed that with the use of the apparatus the materials are softened or rendered frangible and friable before any grinding is required and that the amount of mechanical power required to effect the fine grinding is enormously reduced, being only about ten per cent. of that required in the ordinary process of making cement. The power required for making an impalpable and uniform powder of such very hard materials as limestone and cement rock is very great. But upon calcining these materials they are cracked and shattered and are rendered intimately porous and friable by the expulsion of carbon dioxid throughout their mass and are then easily comminuted to any degree without a great expenditure of power. Furthermore, the carbonic acid gas is driven off in the first rotary kiln, in whole or in part preliminary to the grinding, so that it is not necessary to do this in the second or clinkering kiln proper. The reduction in weight of the material required to be handled up to the clinkering stage is likewise considerable, the material required for the manufacture of one barrel of cement in the old process being from 630 to 650 pounds which must be carried through all the preliminary stages of drying, crushing and fine grinding, while the weight of material for the manufacture of one barrel of cement which it is necessary to submit to the fine grinding with the improved apparatus is from 380 to 400 pounds, the handling of about one-third of the weight of material. The handling of about one-third of the weight of material in the fine grinding is thus avoided. The utility of this is obvious.

The individual firing means for the several kilns permit a good and suitable adjustment of the thermal conditions within such kilns. This is very desirable since the thermal conditions required for calcining are quite different from those required for clinkering.

As the calcines leave the preliminary kiln, they are very hot and it is desirable to cool them down to enable the use of simple types of grinding mechanism. This cooling however is of course attended with a loss of heat which would militate against the economy of the process if it were not restored to the kiln. But by running the hot calcines through the rotary cooler $e$, air taken upward therethrough by the kiln draft at once cools such calcines and is itself heated, and, upon passing into the kiln aids in the combustion of the gas from $d^2$, restoring the heat absorbed from the calcines to the kiln. The air passed over the hot clinker in the clinker cooler and heated thereby similarly aids in combustion in the clinkering kiln, much of the heat of the clinker being restored to the kiln.

It will be understood that the apparatus may be variously arranged according to the requirements of each particular use and that elements of the apparatus differing in details of construction from those indicated in the drawings may also be employed, the invention not being restricted to the precise construction and arrangement of the parts shown and described herein.

We claim as our invention:

1. Cement apparatus comprising a rotary calcining kiln, means comprising an independent fuel supply to heat said kiln to calcining temperature, means to coarsely crush raw cement material and continuously feed the same through said calcining kiln, a regrinding mill receiving said calcined material and finely grinding and mixing the same, a separate clinkering kiln, means to continuously feed said ground calcined material through said clinkering kiln, means including a gas producer to supply combustible to said clinkering kiln and a rotary cooler preheating the air for combustion to heat said kiln and clinker said material therein.

2. In a cement clinker burning apparatus, means for calcining cement material in transit, means for removing and regrinding the calcined material after expulsion of carbon dioxid therefrom and means for clinkering the ground calcines, all in continuous transit.

3. In a cement clinker burning apparatus, the combination with a rotary kiln apparatus having a section adapted for calcining and another section adapted for clinkering, of means for removing, regrinding and returning material intermediate such sections.

4. Cement apparatus comprising a crusher to coarsely crush raw cement material, a rotary continuously operating calcining kiln, means comprising an independent fuel supply to heat said kiln to calcining temperature, a grinding mill continuously receiving said calcined material and finely grinding and mixing the same, feeding means to continuously feed said ground calcined material through said clinkering kiln and means to heat said kiln to clinker the material therein.

5. Cement apparatus comprising a rotary calcining kiln, means comprising an independent fuel supply to heat said kiln to calcining temperature, means to feed cement material through said calcining kiln, a continuously operating clinkering kiln, intermediate means comprising a regrinding device for continuously transferring material from said calcining kiln to said clinkering kiln, means to heat said clinkering kiln to clinkering temperature by combustion therein and means to preheat the air for the combustion in said clinkering kiln before feeding the same thereto.

6. Cement apparatus comprising a rotary calcining kiln, means comprising an independent fuel supply to heat said kiln to calcining temperature, means to continuously feed material through said kiln to calcine the same, a clinker kiln, intermediate means comprising comminuting means to continuously feed said calcined material through said clinkering kiln and means to heat said clinkering kiln to clinker the material therein.

7. In a cement making apparatus, the combination of a rotary calcining kiln, a rotary clinkering kiln and intermediate regrinding means, all in continuous transit of cement material.

8. In a cement making apparatus, the combination of a rotary calcining kiln, a rotary clinkering kiln and intermediate regrinding means, all in continuous transit of cement material, said calcining kiln and said clinkering kiln being provided with independent firing means.

This specification signed and witnessed this twenty-eight day of September A. D., 1906.

R. W. LESLEY.
HENRY S. SPACKMAN.

Signed in the presence of—
J. F. LENNIG,
WM. H. LOYD, Jr.